(12) United States Patent
Heiniger et al.

(10) Patent No.: US 9,302,394 B2
(45) Date of Patent: Apr. 5, 2016

(54) POSITIONING DEVICE

(71) Applicant: ETEL S.A., Môtiers (CH)

(72) Inventors: Laurent Heiniger, Fontainemelon (CH); Hélène Mazerolle, Mauborget (CH); Michel Napoli, Fleurier (CH)

(73) Assignee: ETEL S.A., Môtiers (CH)

( * ) Notice: Subject to any disclaimer, the term of this patent is extended or adjusted under 35 U.S.C. 154(b) by 0 days.

(21) Appl. No.: 14/226,297

(22) Filed: Mar. 26, 2014

(65) Prior Publication Data

US 2014/0291270 A1    Oct. 2, 2014

(30) Foreign Application Priority Data

Mar. 27, 2013   (EP) ..................................... 13161309

(51) Int. Cl.
  *B66C 5/02*    (2006.01)
  *B25J 11/00*   (2006.01)
  *B23Q 1/01*    (2006.01)
  *B23Q 11/00*   (2006.01)

(52) U.S. Cl.
  CPC ............... *B25J 11/005* (2013.01); *B23Q 1/012* (2013.01); *B23Q 11/001* (2013.01)

(58) Field of Classification Search
  CPC ........... B66C 17/12; B25J 5/04; B25J 9/0096; B25J 9/026; B25J 9/123; B25J 11/005
  See application file for complete search history.

(56) References Cited

U.S. PATENT DOCUMENTS

| 4,566,346 A | * | 1/1986 | Petiteau | .................. 74/89.22 |
| 8,040,099 B2 | | 10/2011 | Coleman et al. | |
| 2010/0319182 A1 | * | 12/2010 | Sugimoto et al. | ............... 29/428 |
| 2011/0017714 A1 | * | 1/2011 | Battheu | .................. 219/121.67 |
| 2011/0214586 A1 | * | 9/2011 | Wessel et al. | ................ 104/23.2 |

FOREIGN PATENT DOCUMENTS

| DE | 10 2005 001 845 | | 7/2006 |
| DE | 10 2009 008 900 | | 11/2009 |
| DE | 102012006180 A1 | * | 10/2013 |
| EP | 2 066 996 | | 6/2009 |
| EP | 2305437 A1 | * | 10/2009 |
| JP | 2002-093856 | | 3/2002 |

* cited by examiner

*Primary Examiner* — Emmanuel M Marcelo
(74) *Attorney, Agent, or Firm* — Kenyon & Kenyon LLP

(57) ABSTRACT

A positioning device in a gantry-type construction, include two parallel linear guides with integrated linear drives, each of which supports an X-carriage in a manner allowing movement in an X-direction, and having a cross bar which is joined to the two X-carriages and which, with the aid of an integrated linear drive, supports a carriage in a manner allowing movement in a Y-direction perpendicular to the X-direction. In addition, the positioning device has a toolholder which is guided on the Y-carriage in a Z-direction and bears a tool for processing a workpiece located in an X-Y plane, the tool being located next to the cross bar so as to be offset in the X-direction. A force frame, disposed above the tool in the Z-direction, transfers a process force acting on the tool, to the carriages, without deforming the cross bar by a torque.

9 Claims, 3 Drawing Sheets

PRIOR ART

US 9,302,394 B2

POSITIONING DEVICE

CROSS-REFERENCE TO RELATED APPLICATIONS

The present application claims priority to application No. 13161309.2, filed in the European Patent Office Of Mar. 27, 2013, which is expressly incorporated herein in its entirety by reference thereto.

FIELD OF THE INVENTION

The present invention relates to a positioning device, e.g., for processing a workpiece or for placing components in a plane.

BACKGROUND INFORMATION

For example, such positioning devices are used to position electronic components on a printed circuit board, or perhaps to machine flat workpieces using a tool.

European Patent No. 2 066 996 describes a positioning device in a gantry-type construction in which, supported movably between two parallel linear guides is a cross bar on which a functional element is movably supported with the aid of a further linear guide, so that this functional element is able to be positioned freely in one plane between the two parallel linear guides. For example, a gripper of an automatic pick-and-place machine, a laser of a laser machining center, or a probe system of a coordinate measuring machine are possible as functional element.

European Patent No. 2 066 996 deals primarily with the most precise position measurement possible in connection with such positioning devices, since precise positioning of the functional element is often very important.

German Published Patent Application No. 10 2009 008 900 also deals with such positioning devices in gantry-type constructions. For various reasons, they are not easy to control from the standpoint of automatic control engineering. Therefore, a device is described for controlling a positioning device automatically, which permits particularly precise positioning.

However, if the functional element, which is guided on the cross bar and positioned above the workpiece, must exert considerable force on the workpiece, this may lead to deformation of the components of the positioning device. Because of the great leverage which results due to the gantry-type construction, small deformations may lead to a considerable displacement of the point of application of the tool on the workpiece, which is unacceptable for practical applications with a high requirement for positioning accuracy. An example for such an application is thermocompression bonding, in which electronic components are joined to a printed circuit board by pressure and temperature. Forces up to 500 N are necessary for this purpose. On the other hand, positioning accuracy in the range of one micrometer and less required in such and comparable applications is not uncommon.

SUMMARY

Example embodiments of the present invention provide a positioning device in a gantry-type construction, which despite high process forces, permits precise positioning of functional element.

According to example embodiments of the present invention, a positioning device in a gantry-type construction includes two parallel linear guides with integrated linear drives, each of which supports an X-carriage in a manner allowing movement in an X-direction, and having a cross bar which is joined to the two X-carriages and which, with the aid of an integrated linear drive, supports a Y-carriage in a manner allowing movement in a Y-direction perpendicular to the X-direction. In addition, the positioning device has a toolholder which is guided on the Y-carriage in a Z-direction and bears a tool for processing a workpiece located in an X-Y plane, the tool being disposed next to the cross bar so as to be offset in the X-direction. A force frame, disposed above the tool in the Z-direction, transfers a process force acting on the tool, to the carriages.

Thus, the force frame provides that the actually unfavorable placement of the tool to the side of the cross bar does not lead to a torque which would deform the cross bar and therefore impair the positioning accuracy of the tool.

The process force is applied by a pneumatic cylinder which operates between the force frame and the toolholder, the point of application of the pneumatic cylinder on the toolholder being offset in the X-direction relative to the point of application of the process force on the tool. In this manner, within the toolholder, a torque is purposefully generated which counteracts a torque caused by an asymmetry of the toolholder, so that positioning accuracy is increased by this measure, as well.

Further features and aspects of example embodiments of the present invention are described in more detail below with reference to the appended Figures.

DETAILED DESCRIPTION

Figure 1:
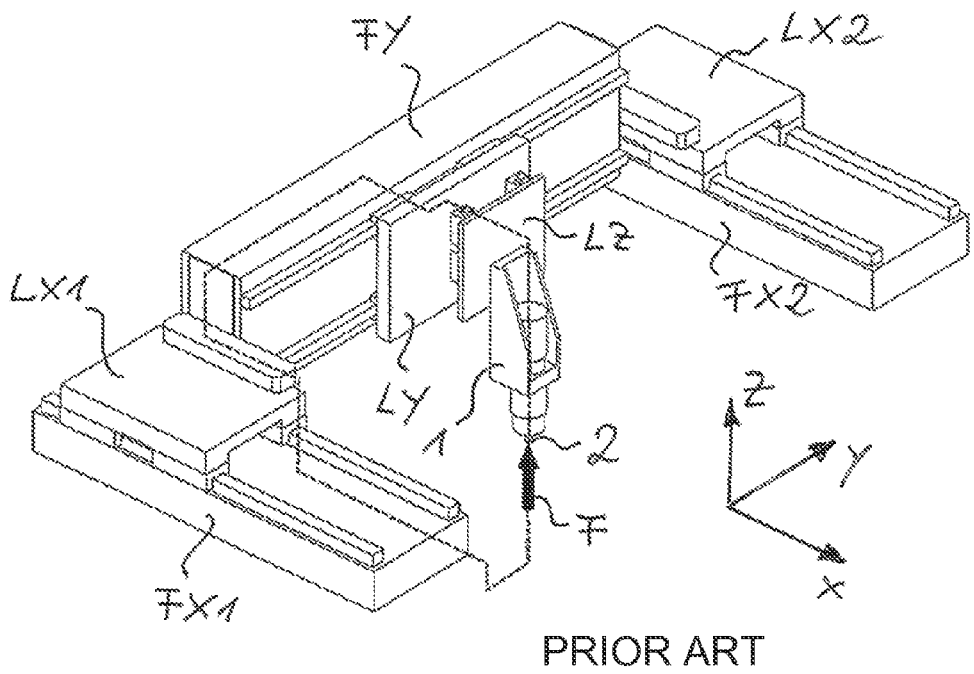
FIG. 1 illustrates a conventional positioning device in a gantry-type construction.

FIG. 1 shows a conventional positioning device in a gantry-type. Two linear guides FX1, FX2 having integrated linear drives are arranged parallel to each other in an X direction and support two X-carriages LX1, LX2 in a manner allowing movement in the X-direction. Secured to the two carriages LX1, LX2 is a linear guide, which forms cross bar FY of the gantry frame of the positioning device. This cross bar FY may be positioned in the X-direction over the working area between the two linear guides FX1 and FX2.

A Y-carriage LY is supported movably on linear guide FY and is able to be positioned in the Y-direction between the two linear guides FX1 and FX2 by a further linear drive. By suitable control of the drives in linear guides FX1, FX2 and FY, Y-carriage LY is able to be positioned freely over the working area between the two linear guides FX1 and FX2.

Y-carriage LY bears a further linear guide with an integrated drive, which supports a Z-carriage LZ in a manner allowing movement in the Z-direction that is perpendicular to the processing plane defined by the X-direction and Y-direction.

Thus, a toolholder 1, mounted on Z-carriage LZ, and a tool 2 retained by the toolholder 1 are able to be positioned in all three spatial directions X, Y and Z. For example, tool 2 may be a gripper which picks up an electronic component and sets it on a printed circuit board placed in the working area. The force F necessary for this purpose is applied by the drive of Z-carriage LZ. Since Z-carriage LZ is offset laterally from cross bar FY in the X-direction, this vertical force F in the Z-direction results in a torque on cross bar FY.

An offset in the X-direction refers to, for example, a distance in the X-direction between the projection of two elements (e.g., cross bar FY and Z-carriage LZ) in the X-Y plane.

The force loop which stresses the components of the positioning device upon placement of tool 2 on the workpiece disposed in the X-Y plane is indicated by a dashed line in FIG. 1. As illustrated, cross bar FY is part of this force loop, which is disadvantageous in the case of high forces.

Figure 2:
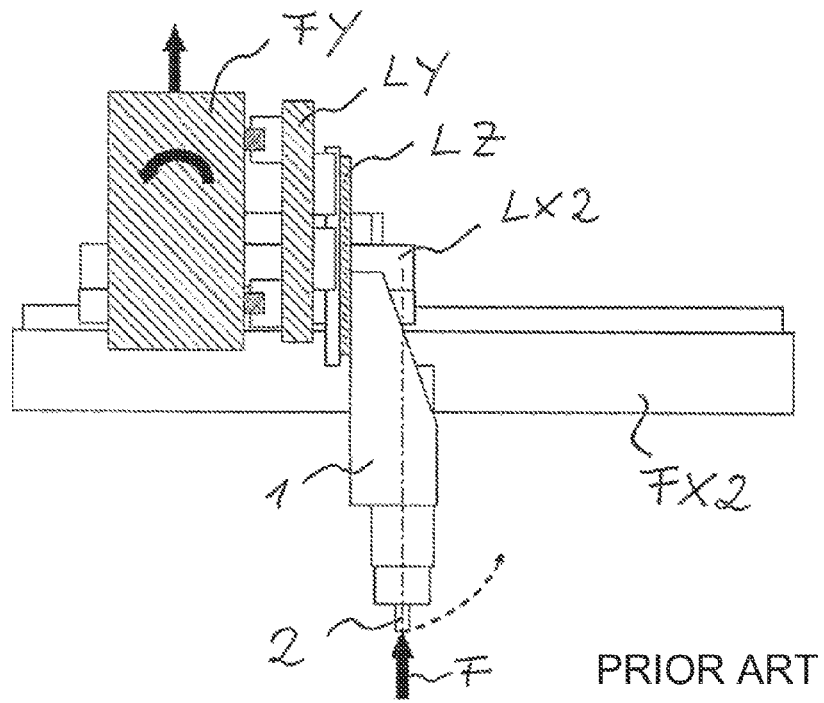
FIG. 2 illustrates a problem occurring in a conventional position device in response to significant process forces.

FIG. 2 is a cross-sectional view through the positioning device illustrated in FIG. 1. The cross-sectional plane lies in the X-Z plane and extends through Z-carriage LZ. Due to a significant process force F as may occur during the thermoelectric bonding of a component onto a printed circuit board, for example, because of the very asymmetrical structure of the positioning device, a high torque occurs which may bend cross bar FY of the gantry frame and thus lead to a displacement of tool 2. This displacement is indicated with a dashed arrow at tool 2. During thermocompression bonding, for example, this displacement also causes tilting of a component to be placed, which means the high parallelism required between the component and printed circuit board cannot be maintained.

A simple solution for avoiding this torque would be a symmetrical structure of the positioning device in terms of process force F. However, there may be demands which make such a symmetrical structure difficult, impractical, or impossible. Thus, it may be necessary that linear guides FX1, FX2 bear a second cross bar having a second tool which must be brought as close as possible to first tool 2. As illustrated in FIGS. 1 and 2, the two tools must then be disposed to the side of their respective cross bar in order to achieve this objective.

Figure 3:
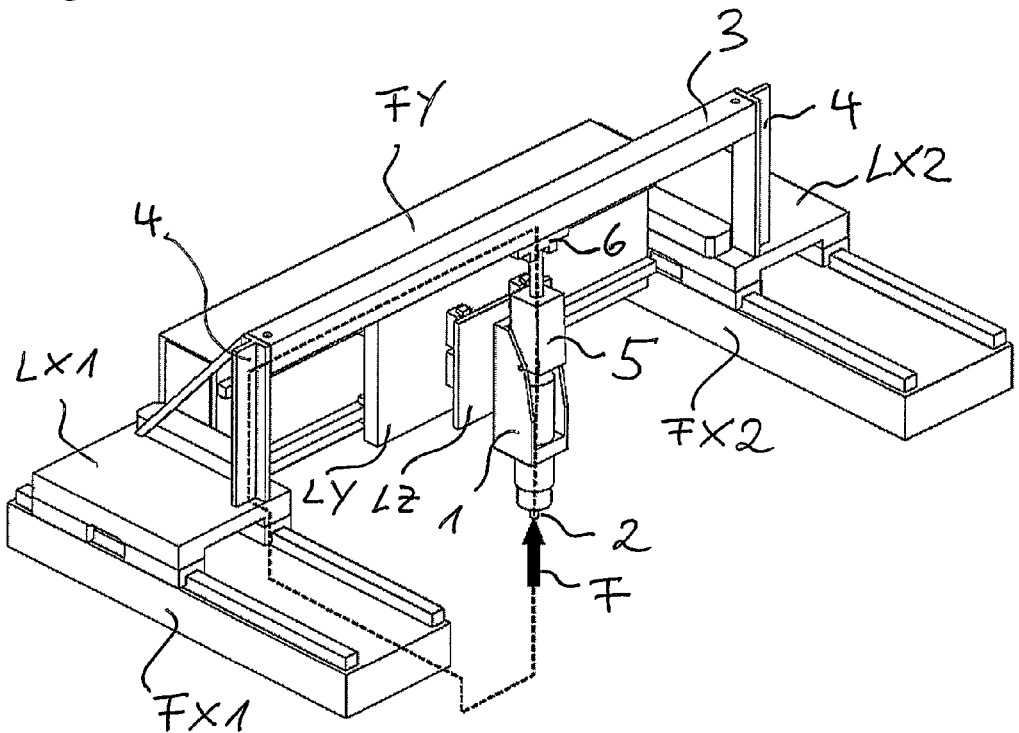
FIG. 3 illustrates a positioning device according to an example embodiment of the present invention.

Therefore, a modification of the conventional positioning device is illustrated in FIG. 3 as an exemplary embodiment of the present invention.

An additional force frame 3 is provided. This force frame 3 extends parallel to cross bar FY of the gantry frame. However, its projection into the X-Y processing plane is not located (like the projection of cross bar FY) far away from the point of application of process force F, but rather substantially closer to this point of application, e.g., above this point of application in the Z-direction. This force frame 3 supports one end of a pneumatic cylinder 5, whose other end is joined to toolholder 1. This pneumatic cylinder 5 applies the greatest portion of process force F, which is imparted to force frame 3 and transferred via supports 4 to carriages LX1 and LX2. Process force F thus does not have to be taken up by cross bar FY. The asymmetry of the mechanism is therefore eliminated or at least significantly reduced in terms of process force F. Therefore, this also holds true for the disruptive torque and the resulting displacement of tool 2.

In order for toolholder 1 to be movable in the Y-direction, force frame 3 has a guideway on its bottom side. Pneumatic cylinder 5 is secured to carriage 6 of this guideway. Thus, toolholder 1 may continue to be positioned in the Y-direction by driven Y-carriage LY. Toolholder 1 is positioned in the Z-direction by the linear drive of the Z-carriage, however, the high process force F needed is applied after the placement of tool 2 on the workpiece, by pneumatic cylinder 5. Since this force F is taken up by force frame 3, it does not stress the linear drive of Z-carriage LZ.

Force frame 3 should provide a certain stiffness in the Z-direction in order to be able to take up process force F, but it must not be completely stiff, since a certain deflection of pneumatic cylinder 5 is able to be equalized and the process force may be adjusted independently of the deflection. Although in many applications the working area in the Z-direction amounts to a few centimeters (for example, in order to avoid collisions with components already placed in the working plane), the area in which a component must be placed with force is substantially smaller, for example, in the range of a few millimeters. Pneumatic cylinders are well-suited for such applications, since their force is not a function of the position in the Z-direction, but rather only the pressure prevailing in the cylinder.

The force loop effective upon loading of the tool is indicated in FIG. 3, as well. As one can see by comparison with FIG. 1, cross bar FY is no longer part of this force loop. The especially disturbingly-acting torque explained in connection with FIG. 2, and the displacement associated with it, no longer occurs.

As explained in greater detail in German Published Patent Application No. 10 2009 008 900 mentioned above, a certain flexibility is necessary between cross bar FY of a gantry frame and the two parallel linear guides FX1, FX2, because the two parallel-running X-carriages LX1, LX2 can never be controlled exactly the same. To that end, suitable interfaces, e.g., in the form of flexible joints, are to be provided on cross bar FY. A disadvantage of the first exemplary embodiment is that this necessary flexibility must be taken into account structurally for force frame 3, as well, which increases the expenditure for such a configuration.

Figure 4:
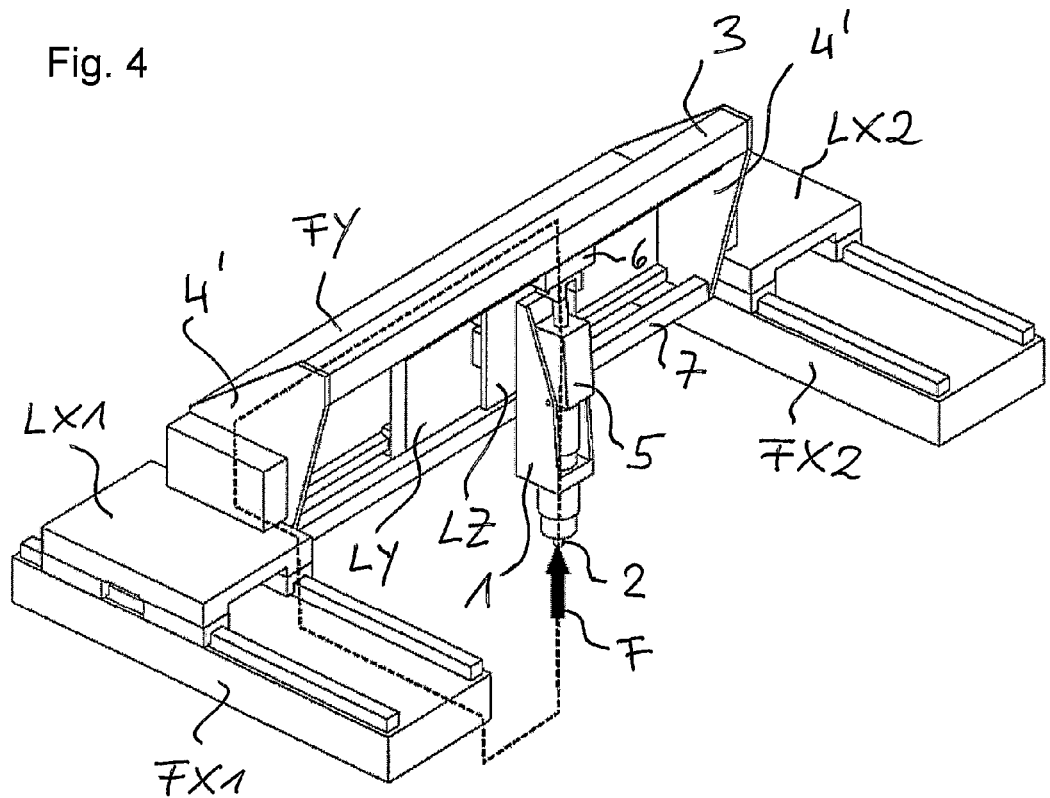
FIG. 4 illustrates a positioning device according to an example embodiment of the present invention.

Therefore, a somewhat different configuration for force frame 3 is provided in the exemplary embodiment illustrated in FIG. 4. Here, as well, the process force is imparted to a force frame 3 located above the point of application of process force F. Force frame 3 is secured directly to cross bar FY by plate-like supports 4'. Force frame 3 then does not need its own mechanism for compensation of slightly different positioning of the two X-carriages LX1, LX2 in the X-direction. However, the interfaces of cross bar FY to X-carriages LX1, LX2 must fully take up process force F, and therefore must be made correspondingly more stable than in the first exemplary embodiment.

In addition, a further cross member 7 joins the two supporting plates 4'. It provides greater stiffness and therefore increases its first natural frequency.

The effective force loop is indicated in FIG. 4, as well. Since here, force frame 3 is joined via plates 4' to both ends of cross bar FY, it becomes part of the force loop. However, since the forces, and therefore the torque, only act fully at the two ends or at the interfaces to X-carriages LX1, LX2 (in contrast to conventional systems where, in the most unfavorable case, the torque acts in the middle of the cross bar), by the provision of suitably stable joints between cross bar FY and carriages LX1 and LX2 of the X-direction, the force is able to be transferred completely to carriages LX1, LX2, without deformation of cross bar FY by a torque.

Force frame 3 is able to prevent a great portion of the unwanted displacement of tool 2. However, because of the asymmetry of toolholder 1 itself, small displacements survive which cannot be eliminated by force frame 3.

Figure 5:
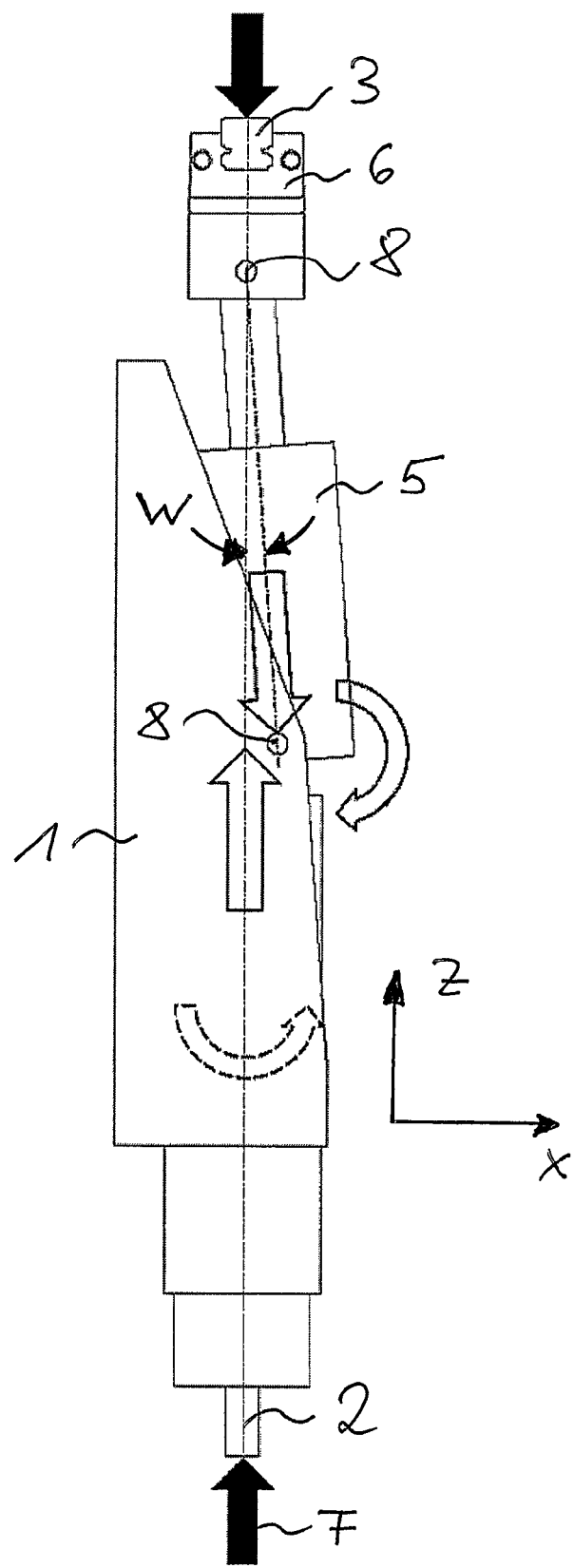
FIG. 5 illustrates a positioning device according to an example embodiment of the present invention, which permits particularly precise positioning.

FIG. 5 illustrates toolholder 1, tool 2, and pneumatic cylinder 5. It is joined by two joints 8 to toolholder 1 and to carriage 6 which is guided on force frame 3. Because toolholder 1 is joined on one side to Z-carriage LZ for the Z-direction, and on the opposite side, as described above, the closest possible positioning of tool 2 to a second tool should be permitted. Toolholder 1 is formed asymmetrically relative to the direction of process force F. This asymmetry leads to a torque, which is indicated by a dashed line in FIG. 5, and that leads to a small, but nevertheless objectionable displacement of tool 2.

By placing pneumatic cylinder 5 so as to be inclined by an angle W, and by the fact that the point of application of the force of pneumatic cylinder 5 on toolholder 2 is thereby offset by a small amount in the X-direction, a torque is generated which counteracts precisely the torque produced before by the asymmetry of toolholder 1. This torque produced by the offset of the point of application is indicated in FIG. 5 by a continuous curved arrow. The two forces acting in this area and offset against each other are likewise indicated.

On particular machines, the unwanted displacement of tool may be eliminated completely by an angle W of 3 degrees, or may at least be reduced to an extent that it is not troublesome. This optimization holds true only for a small working area in the Z-direction. As mentioned above, this is not problematic during the assembly of printed circuit boards, for example, since despite of a large traveling range of the Z-axis, the problematic forces occur only in a quite small area, e.g., upon placement of the component on the printed circuit board.

Since this angle W may be a function of the maximum process force F needed and other boundary conditions, it is additionally provided that angle W may be adjustable. This may be provided by a simple mechanism, with whose aid lower joint 8 may be shifted horizontally in the X-direction. If one loads tool 2 with the maximum process force F in the Z-direction, and in this context, measures the direction of the forces occurring at the point of application using a multidimensional force sensor, one is able to change angle W manually until all horizontal forces (in the X-direction or Y-direction) disappear, for then no torque is exerted on toolholder 1.

The inclined position of pneumatic cylinder 5 illustrated in FIG. 5 may be employed advantageously in the exemplary embodiments illustrated in FIGS. 3 and 4.

A further possibility for maintaining the point of application of the force—offset in the X-direction relative to the direction of process force F—of pneumatic cylinder 5 on toolholder 1 in order to counteract the torque generated due to the asymmetry of toolholder 1 is to keep pneumatic cylinder 5 parallel to process force F, but offset in the X-direction, for example, by also shifting upper joint 8 illustrated in FIG. 5 in the X-direction, so that it sits above lower joint 8 relative to the X-Y plane. Pneumatic cylinder 5 is thus perpendicular to the X-Y plane, but is offset in the X-direction relative to process force F, so that a torque acts on toolholder 1 that counteracts the torque caused by the asymmetry of toolholder 1.

This alternative position of pneumatic cylinder 5 may also be used with the exemplary embodiments illustrated in FIGS. 3 and 4.

What is claimed is:

1. A positioning device in gantry-type construction, comprising:

two parallel linear guides having integrated linear drives, each linear guide supporting a first carriage in a manner allowing movement in a first direction;

a cross bar joined to the two first carriages and which, with the aid of an integrated linear drive, supports a second carriage in a manner allowing movement in a second direction perpendicular to the first direction;

a toolholder guidable on the second carriage in a third direction perpendicular to the first direction and to the second direction, the toolholder adapted to hold a tool for processing a workpiece located in a plane defined by the first direction and the second direction, the tool being located next to the cross bar and offset in the first direction; and a force frame, located above the tool in the third direction, adapted to transfer a process force acting on the tool to the first carriages.

2. The positioning device according to claim 1, further comprising supports supporting the force frame, the force frame adapted to transfer the process force to the first carriages via the supports without deformation of the cross bar.

3. The positioning device according to claim 1, further comprising supports supporting the force frame and securing the force frame to the first carriages.

4. The positioning device according to claim 1, further comprising supports securing the force frame to ends of the cross bar.

5. The positioning device according to claim 1, further comprising a pneumatic cylinder adapted to operate between the force frame and the toolholder to apply the process force, a point of application of the pneumatic cylinder on the toolholder being offset in the first direction relative to a point of application of the process force on the tool.

6. The positioning device according to claim 5, wherein the offset in the first direction between the point of application of the pneumatic cylinder on the toolholder and the point of application of the process force on the tool results in elimination of all forces in the first direction and/or the second direction in response to an application of the process force on the tool in the third direction.

7. The positioning device according to claim 5, wherein the offset in the first direction between the point of application of the pneumatic cylinder on the toolholder and the point of application of the process force on the tool is a result of tilting the pneumatic cylinder by an angle relative to the third direction.

8. The positioning device according to claim 5, wherein the offset in the first direction between the point of application of the pneumatic cylinder on the toolholder and the point of application of the process force on the tool is a result produced by placing the pneumatic cylinder parallel to the third direction, but offset in the first direction relative to the process force.

9. The positioning device according to claim 5, wherein the offset in the first direction between the point of application of the pneumatic cylinder on the toolholder and the point of application of the process force on the tool is adjustable.

* * * * *